United States Patent [19]

Schweller

[11] 4,060,226
[45] Nov. 29, 1977

[54] APPARATUS FOR INJECTION MOLDING

[76] Inventor: John Schweller, 3075 Plainfield Road, Dayton, Ohio 45432

[21] Appl. No.: 703,424

[22] Filed: July 8, 1976

[51] Int. Cl.² ............................................... B29B 1/10
[52] U.S. Cl. ...................................... 366/75; 425/203; 425/208
[58] Field of Search ............... 425/203, 440, 4 C, 243, 425/207, 208; 259/191, 192, 185

[56] References Cited
U.S. PATENT DOCUMENTS

| | | | |
|---|---|---|---|
| 3,164,563 | 1/1965 | Maxwell et al. | 425/243 X |
| 3,263,276 | 8/1966 | Maier | 425/203 X |
| 3,535,737 | 10/1970 | Hendry | 425/203 X |
| 3,981,649 | 9/1976 | Shimano et al. | 425/4 C |

*Primary Examiner*—J. Howard Flint, Jr.
*Assistant Examiner*—W. R. Briggs
*Attorney, Agent, or Firm*—Burns, Doane, Swecker & Mathis

[57] ABSTRACT

A method and apparatus are disclosed for the production of injection molded products from synthetic resinous materials, such as nylon, which tend to be degraded when exposed to oxygen while they are heated to the temperatures required for injection molding. The apparatus includes a barrel having a discharge opening, a screw receiving bore and a vent opening between the feed opening and the discharge opening. A two stage rotatable reciprocable screw is mounted in the bore and includes a vented portion in registry with the vent opening. Water vapor and volatiles are generated during plasticization in the first stage of the screw, and evolve as the material enters the vent section of the second stage. The vapors are exhausted through the vent opening. The vent opening is provided with a check valve which readily permits the exhaust products to pass from the screw receiving bore. However, the check valve effectively prohibits the entrance of atmospheric air through the vent opening to the vent section.

5 Claims, 3 Drawing Figures

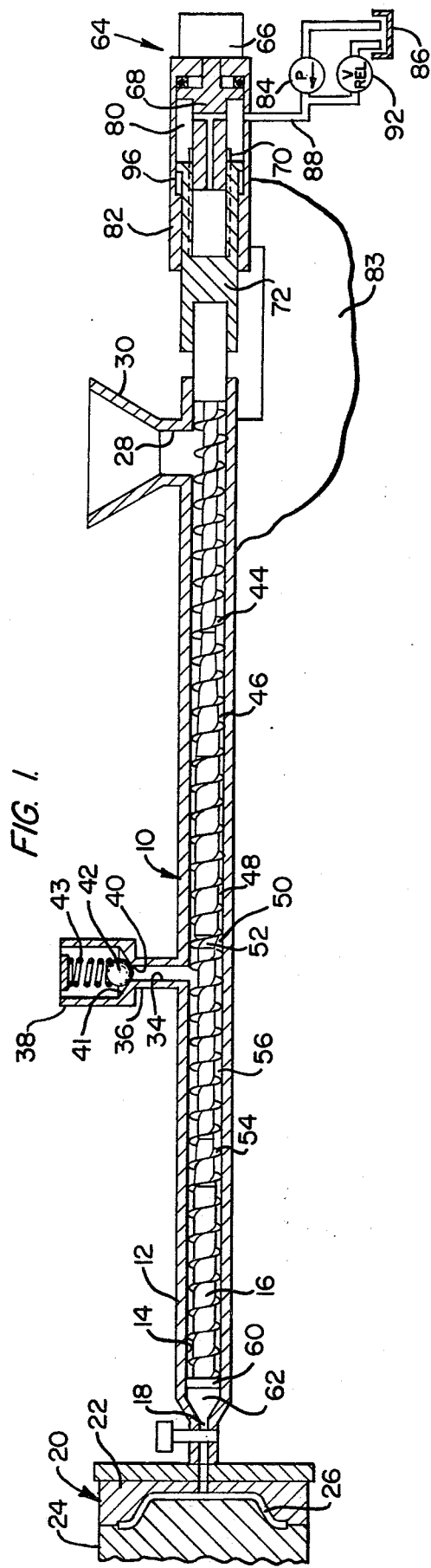
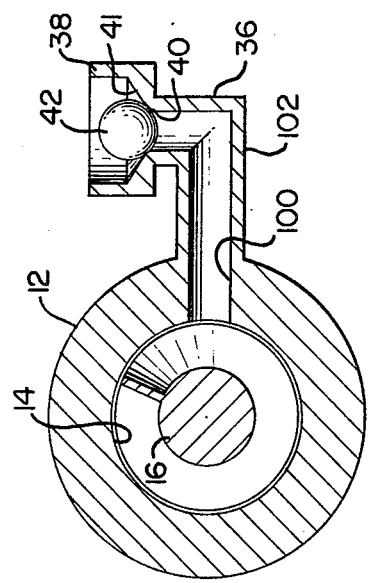
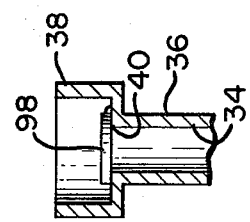
FIG. 1.
FIG. 2.
FIG. 3.

4,060,226

APPARATUS FOR INJECTION MOLDING

BACKGROUND OF THE INVENTION

This invention relates generally to methods and apparatus for injection molding of synthetic resinous materials. More particularly, this invention concerns methods and apparatus for vented injection molding of articles from synthetic nylon materials in continuous cyclical production.

The successful injection molding of degradable synthetic resinous materials has long presented a problem to those interested in making molded products in continuous commercial production. Among the undesirable characteristics manifested by degradable materials are hygroscopicity and oxidation due to a reaction with atmospheric oxygen.

When deaing with hygroscopic materials in common commercial practice, the materials in particulate form are passed through a separate predrying apparatus before entering molding apparatus. In the predrying apparatus the particulate material is exposed to dry heat for a predetermined period of time at a temperature below the material melting temperature. This predrying has been necessary since water, present in the particulate material, vaporizes during material plasticization and generates pockets of water vapor. The pockets of water vapor, as well as other volatilized products, result in imperfections in the molded product.

To reduce water absorption from humid air, the particuate material is sometimes packaged and stored in the bags until actually supplied to an injection molding machine. In this manner the time during which air can affect the material is substantially reduced.

In an effort to overcome some of the disadvantages associated with production of molded objects from hygroscopic synthetic resinous materials, the use of vented injection molding machines has been suggested. The intended advantage of vented injection molding machines is the elimination of the material pedrying step. A reduction in the cost, as well as time, involved in molding products might be possible. However, with vented injection molding machines handling degradable synthetic resinous materials, different problems have manifested themselves.

One of the problems has concerned the discharge or bleed of material from the vent section itself, that is, the molten and plasticized material has a tendency to pass outwardly of the barrel through the vent openings through which water vapor and volatile gases are intended to be exhausted.

Another more particular problem concerns the length of time during which the satisfactory molded articles may be produced. With the known vented injection molding machines it has been found that only a small number of hours of continuous running is available during which acceptable molded products are fabricated from atmospherically degradable materials, such as nylons. After running a small number of hours, the molded product does exhibit black specs resulting from high temperature oxidation. Moreover, it is necessary after a small number of hours to dismantle the injection molding machine and clean residue from the screw which is mounted therein.

Accordingly, it is seen that a need continues to exist for a truly effective vented injection molding machine which is capable of producing molded articles from atmospherically degradable synthetic resinous materials, such as nylon.

SUMMARY OF THE INVENTION

An injection molding machine according to the present invention preferably includes a barrel having a discharge opening at one end from which plasticized material is injected into a mold and a feed opening at the other end through which particulate synthetic resinous material enters the machine. The barrel also includes a longitudinally extending screw receiving bore connecting the discharge opening and the feed opening. Between the feed opening and the discharge opening, the barrel is provided with a vent opening that communicates with the bore. Disposed within the bore is a rotatable, reciprocable screw which accepts, masticates and plasticates synthetic particulate material to a moldable consistency. The material is accumulated in a chamber defined in the bore between the one end of the screw and the discharge opening in the barrel.

The screw has a first stage which plasticizes particulate material and a second stage which devolatilizes and pumps plasticized material to the chamber. As plasticized material passes from the first stage it enters a low pressure vent section of the second stage. The vent section is defined by a relatively small root diameter on the screw and is in registry with the barrel vent opening.

As the plasticized material enters the vent section, entrained volatiles, including water vapor, flash into the volume of the reduced pressure vent section and exhaust through the vent opening to the atmosphere or another suitable treatment apparatus. Plasticized dried and devolatilized material is then advanced by a pumping portion of the second stage through a back flow limiting valve assembly into the accumuation chamber.

In order to allow the escape of devolatilized products including water vapor, a check valve assembly is provided at the vent opening. The check valve assembly is designed to operate on a very low pressure differential so that the exhaust gases are readily exhausted; however, atmospheric air is effectively excluded from entering the vent opening by the check valve assembly.

The screw is rotated during the plasticization and accumulation portion of the molding cycle by a suitable rotary drive assembly. A suitable reciprocatory drive assembly is attached to the screw and provides a force moving the screw forwardly in the barrel during the injection portion of the molding cycle to force material accumulated in the chamber through the discharge opening and into a mold. During the holding portion of the cycle the reciprocatory means maintains a suitable predetermined pressure on the screw to ensure that the molded cavity is filled with material.

The check valve assembly may include a suitable spherical valve member of a lightweight material that may be resiliently biased or gravitationally seated in a generally vertically extending conduit. Alternatively, the check valve assembly may be a pivotally mounted flapper valve assembly.

BRIEF DESCRIPTION OF THE DRAWINGS

Many objects of the present invention will be apparent to those skilled in the art when this specification is read in conjunction with the attached drawings wherein like reference numerals have been applied to like elements and wherein:

FIG. 1 is an elevational view in partial cross section of an injection molding machine constructed in accordance with the present invention;

FIG. 2 is a view in partial cross section illustrating an alternate vent assembly for use in conjunction with the apparatus of FIG. 1; and FIG. 3 is a view in partial cross section of an injection molding apparatus similar to that of FIG. 1 but with a horizontal vent.

DESCRIPTION OF THE PREFERRED EMBODIMENTS

Turning now to FIG. 1, an injection molding machine 10 is illustrated. The molding machine 10 includes a barrel assembly 12 having a generally cylindrical longitudinally extending bore 14 which is adapted to receive a screw member 16. One end of the screw receiving bore 14 communicates with a discharge opening 18 through which plasticized material is forced into an injection mold assembly 20. The injection mold assembly 20 includes a first mold portion 22 and a second mold portion 24 which cooperate to define a mold cavity 26 that is configured to define an object to be molded.

The second end of the barrel 12 is provided with a feed opening 28. Preferably, the feed opening 28 is vertically oriented so that particulate feed material will enter the screw receiving bore 14 by means of gravity. The feed opening 28 communicates with a suitable conventional feed hopper 30 as illustrated.

Also extending through the barrel 12 and communicating with the screw receiving bore 14 is a vent opening 34 which may be vertically disposed as illustrated in FIG. 1. The vent opening 34 may communicate with a suitable conduit 36 having an enlarged upper end portion 38. The enlarged upper end portion 38 preferably houses a check valve assembly. The check valve assembly includes a valve seat 40 mounted on the conduit 36 and encircling the vent opening 34. The valve seat 40 is adapted to receive a generally spherical valve element 42.

Preferably, the valve element 42 is hollow and fabricated of a lightweight material. In this manner, the valve element 42 will lift from the valve seat 40 in response to a small differential pressure thereacross. A suitable light spring 43 may be provided to resiliently urge the ball 42 against the seat 40. The spring 43 is sized so that the valve will open in response to a pressure differential on the order of an inch of water or less. Alternately, the spring 43 may be omitted and the ball 42 may be seated by gravity. The frustoconical internal surface 41 of the conduit portion 38 is convergent downwardly toward the vent opening 34 and assists the valve ball 42 to center itself on the seat 40.

In the face of a pressure gradient which would allow atmospheric air to enter the vent opening 34 by passing between the valve element 42 and the valve seat 40, the valve ball 42 cooperates with the valve seat 40 and effectively excludes or inhibits the flow of atmospheric air into the vent opening 34. Accordingly, association between air and material in the machine is further limited as compared with known prior apparatus.

With continued reference to FIG. 1, the screw 16 has two stages. The first stage is provided with an outwardly extending first helical screw flight portion 44 which extends from the feed opening 28 to a position just short of the vent opening 34 when the screw 16 is in the advanced position illustrated. The second stage includes a second helical screw flight portion 54 extending from a position upstream of the vent opening 34 to the end of the screw 16 which is adjacent the discharge opening 18.

The first screw flight portion 44, the bore 14 and the screw root define a first generally helical channel which extends along the screw 16 from the feed opening 28 to a position intermediate the feed opening 28 and the vent opening 34. The first helical channel has a generally uniform pitch and a variable depth. Depth of the helical channel may be defined by the difference between the diameter of bore 14 and the diameter of the screw root. The deepest portion of the first helical channel communicates with the feed opening 28 and maintains registry therewith during axial movement of the screw 16 longitudinally within the barrel 12.

The deepest portion of the first helical channel conveys material longitudinally along the screw 16 toward a decreasing depth portion 46, characterized by increasing root diameter, and into a shallow depth pump portion 48, characterized by a uniform relatively large root diameter. As particulate material from the feed opening 28 enters the channel, the material is conveyed therealong by rotary motion of the screw 16. The decreasing depth of the helical channel causes the particulate material to be compressed. In addition, a mastication and kneading action developed by interaction of the screw flight 44 with the screw receiving bore 14 causes the particulate material to be heated and plasticized to a moldable consistency.

The second helical screw flight portion 54 may be a continuation of the first screw flight portion 44 and extends from a decreasing root diameter portion 50 to the end of the screw 16. The second screw flight 54, the screw receiving bore 14 and the screw root define a second generally helical longitudinally extending channel 56 having a generally uniform pitch and a variable depth. The deepest portion of the second helical channel 56 is in communication and general registry with the vent opening 34. This deepest portion has a root diameter less than that of the first stage pump portion 48 so as to define a vent portion of the second helical channel 56. The vent portion has a capacity to convey more plasticized material than actually enters the vent portion from the first stage pump portion 48. Accordingly, the plasticized material in the vent portion does not fill the screw flight and the vent portion has an internal pressure corresponding substantially to atmospheric pressure.

As the plasticized material passes from the first stage pump portion 48 into the decreasing root diameter portion 50, pockets of volatilized vapor, including water vapor, that were pressurized in the first stage are exposed to atmospheric pressure and are quickly released or flashed from the plasticized material. Moreover, the kneading which occurs by the interaction of the screw flight portion 54 and the bore 14 in the vent section causes further evolution of volatile gaseous materials into the vent section.

The evolved gases pass outwardly through the vent opening 34 (FIG. 1) and lift the valve element 42 for escape to the atmosphere. The plasticized and devolatilized nylon material is subsequently advanced by rotation of the screw 16 through the helical channel 56 toward the end of the screw 16. As the material is advanced it is compressed and pressurized by the reducing depth of the helical channel 56 characterized by the increasing screw root diameter.

At the end of the screw 16 is a suitable conventional valving member 60 which allows the plasticized material to pass into a chamber 62 defined between the end of the bore 14, the discharge opening 18, and the end of the screw 16. The chamber 62 provides a reservoir for the accumulation of plasticized material having a moldable constituency. As plasticized material accumulates in the reservoir 62, the screw 16 translates to the right in FIG. 1 to increase the volume of the chamber. The valving member 60 is also effective to restrict the flow of plasticized material from the chamber 62 to the second helical channel when the pressure in the chamber 62 exceeds the pressure in the second helical channel.

The end of the screw 16 remote from the discharge opening 18 is preferably provided with rotary drive means 64 for rotating the screw 16 during the plasticization portion of an injection molding cycle. The rotary drive means may include a suitable conventional motor 66 which drives a shaft 68 having a driving connection 70 with a piston portion 72.

The piston portion 72 is positioned at the second end of the screw 16 and is longitudinally reciprocable in a cavity 80 defined by a housing 82 connected to the machine base 83. The cavity 80 is divided into a first working chamber 80 and a second chamber 96 by the piston portion 72. The first working chamber 80 communicates with a suitable conventional pump 84 which supplies hydraulic fluid from a reservoir 86 through conduit 88. This flow of hydraulic fluid is operable to cause the piston 72 to move to the left in the cavity 80 thereby advancing the screw 16 into the accumulation chamber 62.

The screw 16 advances into the accumulation chamber 62 during the injection portion of a molding cycle. Simultaneously, the valve member 60 effectively closes off the second helical channel 56 to prevent the flow of plasticized material thereinto. In this manner, the plasticized material in reservoir 62 is forced to move out of the discharge opening 18 and into the mold cavity 26.

During the holding portion of the mold cycle just after the injection stroke, hydraulic pressure level in the first working chamber 80 is reduced. In this manner, hydraulic force is maintained on the plasticized material in the mold cavity 26 so that the molded article will accurately conform to the mold cavity 26.

At the end of the holding portion of a molding cycle just after the injection stroke, the screw 16 is again rotated by the rotary drive means 64. The accumulation of material in the reservoir 62 is sufficient to translate the screw 16 to the right (FIG. 1) or rearwardly. This rearward movement may be resisted by setting a suitable pressure on a suitable conventional relief valve 92 communicating with the conduit 88 and the first working chamber 90.

Turning now to FIG. 2, an alternate embodiment of the vent check valve assembly is disclosed. More particularly, the enlarged upper portion 38 of the conduit 36 is provided with a suitable conventional flapper valve 98 which cooperates with the valve seat 40 to inhibit the flow of atmospheric air into the vent opening 34.

With reference to FIG. 3, yet another embodiment of the present invention is illustrated. The barrel 12 is provided with a generally horizontally extending vent opening 100 in contrast to the vertical vent opening of FIG. 1. The horizontal vent opening 100 (FIG. 3) is provided with a horizontal conduit 102 and a vertical conduit 36. The enlarged upwardly open portion 38 of the conduit 36 is in fluid communication with the vent opening 100. The valve seat 40 and the valve element 42 are the same as those discussed above. It is also possible to provide the upwardly extending portion 38 of the conduit 102 with a flapper valve 98 as disclosed in FIG. 2.

In operation, particulate synthetic resinous material, such as nylon, may be introduced to the hopper 30 (FIG. 1). With the screw 16 being rotated by the rotary drive means 64, the first helical screw flight 44 conveys the particulate material into the decreasing depth portion 46 and the first pump portion 48 of the first stage. Heat is transferred to the material in the bore from suitable conventional heaters that are carried by the barrel 12.

Concurrently with material conveyance, interaction between the screw flight 44 and the bore 14 cooperates to masticate, plasticize and heat the particulate material to form an essentially contiguous plasticized mass having a consistency suitable for molding. The first pump portion controls the rate at which the plasticized material enters the vent section 56. In addition, the first pump portion 48 creates an hydraulic seal at the upstream of the vent section which prohibits atmospheric air in the feed opening 28 from entering the vent section.

During the plasticization operation, water which may have adhered to the particulate feed material is heated above its vaporization point and forms small pockets of entrained water vapor. Similarly, other volatilized gaseous material flash into the relatively low pressure free space surrounding the material. In this manner, a slight positive pressure is developed in the vent section causing the evolved gaseous materials including water vapor to lift the valve element 42 against the spring 43 from the valve seat 40 and to be exhausted through the vent opening 34 through the space between the valve element 42 and the seat 40.

The second screw flight 54 then accumulates and conveys the substantially dried and devolatilized plasticized material. Simultaneously the screw flight 54 kneads the plasticized material causing other entrained vapor pockets to be exposed to low pressure and therefore be exhausted.

As the second screw flight advances the plasticized material through the second helical channel portion 56, the decreasing channel depth eventually becomes filled by the material thus causing an hydraulic seal at the downstream end of the vent section. The plasticized material passes through the valving member 60 at the end of the screw 16 and into the chamber 62.

While the screw is rotating during the plasticization or shot forming portion of a molding cycle, the valve member 60 allows the plasticized material to enter the chamber 62. At the end of the plasticization portion of the molding cycle the rotary drive means 64 is stopped and hydraulic pressure is introduced into the first working chamber 80 of the reciprocatory drive means.

Then, the screw 16 translates to the left (in FIG. 1) and the valve member 60 closes off the communication between the second helical channel 56 and the chamber 62. Accordingly, the plasticized material in the chamber 62 is expelled from the discharge opening 18 and into the mold cavity 26.

It will be noted that, during this reciprocation of the screw 16, the vent section of the second stage of the screw is continually in registry with the vent opening 34. However, since additional material is not entering the vent section from the first pump portion 48, positive pressure due to evolving vapors in the vent section relative to atmospheric pressure is effectively lost. Accordingly, the valve ball 42 seats on the seat 40 to prevent the introduction of atmospheric air into the vent section.

It has been noted that at the beginning of the plasticization portion of the molding machine cycle, apparatus not provided with a valving element 42 gulps atmospheric air. While the phenomenon is not fully understood, it is believed that atmospheric oxygen enters an unvalved vent opening 34 and oxidizes the plasticized material in the vent section and the downstream portions of the screw. It is this oxidation of nylon material which causes a loss of the bright white color in the molded product and generates a residue in the vent section of the screw.

Accordingly, it has been found that when an injection molding machine constructed and operated as described above is used to mold a synthetic nylon material, an essentially continuous commercial production rate can be obtained without the periodic dismantling of the injection molding machine after a few hours of running time to clean the screw so that acceptable products will be obtained.

Moreover, it has been observed that in some instances, the molded product fabricated from apparatus of the present invention has a cleaner and more brightly white appearance than the actual feed material entering the apparatus hopper.

It is believed that the apparatus in accordance with the present invention provides one of the first commercially practicable continuous injection molding devices suitable for use with nylon materials.

It should now be apparent that there has been provided in accordance with the present invention a novel method and apparatus for vented injection molding. Moreover, it will be apparent to those skilled in the art that numerous modifications, variations, substitutions and equivalents exist for features of the invention which do not depart from the scope of the invention. Accordingly, it is expressly intended that all such modifications, variations, substitutions and equivalents of the elements of the invention as defined in the appended claims be embraced thereby.

I claim:

1. An injection molding machine for accepting synthetic resinous material degradable when heated and exposed to air, working the material, and forming the material, comprising:
    a barrel having a material discharge opening, a screw receiving bore communicating with the discharge opening, a feed opening communicating with the screw receiving bore and a vent opening communicating with the screw receiving bore intermediate the feed opening and the discharge opening;
    screw means mounted in the screw receiving bore, having a first stage upstream of said vent opening and a second stage communicating with the vent opening so that vapor evolved from the material leaving the first stage will discharge through the vent opening;
    rotary means connected to the screw means and operable to rotate the screw means in the barrel;
    reciprocatory means connected to the screw means and operable to reciprocate the screw means in the barrel; and
    check valve means communicating with the vent opening interposed between said vent opening and the atmosphere for blocking flow of air from the atmosphere into said vent, operable to open in response to positive pressure of evolved vapor to exhaust the evolved vapor from the screw receiving bore and operable to close in the absence of positive pressure to substantially exclude flow of air into the bore, so as to avoid contact of air and plasticated material.

2. The machine of claim 1 wherein the vent opening is disposed in a generally vertical orientation.

3. The machine of claim 1 wherein the vent opening is disposed in a generally horizontal orientation.

4. The machine of claim 1 wherein the check valve means includes:
    a valve seat encircling the vent opening; and
    a generally spherical valve element sealingly engaging the valve seat and operable to be lifted from the valve seat in response to pressure generated in the screw receiving bore by evolving vapor.

5. An injection molding machine for accepting nylon material, working the material, and forming the material, comprising:
    a barrel having a material discharge opening, a screw receiving bore communicating with the discharge opening, a feed opening communicating with the screw receiving bore and a vent opening communicating with the screw receiving bore intermediate the feed opening and the discharge opening;
    a screw member mounted in the screw receiving bore and having
        a first end at the discharge opening that cooperates with the screw receiving bore to define a chamber,
        a first screw flight in registry with the feed opening and operable with the barrel to accept and work the nylon material,
        a second screw flight downstream of the first screw flight having a vent region communicating with the vent opening so that vapor evolved from the material will discharge through the vent opening, and
        valve means downstream of the second screw flight operable to admit material to the chamber during a plasticizing portion of a molding cycle and to inhibit flow of material into the second screw flight from the chamber during an injection portion of the molding cycle;
    rotary means connected to the screw and operable to rotate the screw in the barrel during the plasticizing portion of the molding cycle;
    reciprocatory means connected to the screw and operable to advance the screw toward the discharge opening during the injection portion of the molding cycle, to retain the screw at an advanced position during a holding portion of the molding cycle and to assist retraction of the screw from the discharge opening during the plasticizing portion; and
    check valve means interposed between said vent opening and the atmosphere for blocking the flow of air from the atmosphere into said vent, communicating with the vent opening, operable to open in response to positive pressure of evolved vapor to exhaust the evolved vapor and operable to close in the absence of positive pressure to substantially exclude atmospheric air from the screw receiving bore, so as to avoid contact of air and plasticated material.

* * * * *